US012040883B2

(12) United States Patent
Steuer et al.

(10) Patent No.: US 12,040,883 B2
(45) Date of Patent: Jul. 16, 2024

(54) MEDIA USAGE MONITORING AND MEASUREMENT SYSTEM AND METHOD

(71) Applicant: Anonymous Media Research LLC, New York, NY (US)

(72) Inventors: Jonathan S. Steuer, New York, NY (US); Christopher W. Otto, San Francisco, CA (US)

(73) Assignee: ANONYMOUS MEDIA RESEARCH HOLDINGS, LLC, New York, NY (US)

( * ) Notice: Subject to any disclaimer, the term of this patent is extended or adjusted under 35 U.S.C. 154(b) by 0 days.

(21) Appl. No.: 18/076,327

(22) Filed: Dec. 6, 2022

(65) Prior Publication Data
US 2023/0351439 A1 Nov. 2, 2023

Related U.S. Application Data

(60) Continuation of application No. 17/199,355, filed on Mar. 11, 2021, now abandoned, which is a
(Continued)

(51) Int. Cl.
*H04H 60/37* (2008.01)
*G06Q 30/0242* (2023.01)
(Continued)

(52) U.S. Cl.
CPC ......... *H04H 60/37* (2013.01); *G06Q 30/0246* (2013.01); *H04L 65/611* (2022.05);
(Continued)

(58) Field of Classification Search
CPC ............ G06Q 30/0246; H04L 65/4076; H04L 65/605; H04L 67/22; H04H 60/37; H04H 60/33
See application file for complete search history.

(56) References Cited

U.S. PATENT DOCUMENTS

| 3,919,479 A | 11/1975 | Moon et al. |
| 4,677,466 A | 6/1987 | Lert, Jr. et al. |

(Continued)

FOREIGN PATENT DOCUMENTS

| WO | 0227600 A2 | 4/2002 |
| WO | 03091990 A1 | 11/2003 |

(Continued)

OTHER PUBLICATIONS

Pinto, "Mediawatch meters a complex mix of media, passively," Indiantelevision.com, www.inidiantelevision.com/headlines/y2k5/feb/feb117.htm, Feb. 19, 2005, 5 pages.
(Continued)

*Primary Examiner* — Chenea Davis
(74) *Attorney, Agent, or Firm* — MASCHOFF BRENNAN; Michael Mauriel

(57) ABSTRACT

Media monitoring and measurement systems and methods are disclosed. Some embodiments of the present invention provide a media measurement system and method that utilizes audience data to enhance content identifications. Some embodiments analyze media player log data to enhance content identification. Other embodiments of the present invention analyze sample sequence data to enhance content identifications. Other embodiments analyze sequence data to enhance content identification and/or to establish channel identification. Yet other embodiments provide a system and method in which sample construction and selection parameters are adjusted based upon identification results. Yet other embodiments provide a method in which play-altering activity of an audience member is deduced from content offset values of identifications corresponding to captured samples. Yet other embodiments provide a monitoring and measurement system in which a media monitoring device is adapted to receive a wireless or non-
(Continued)

wireless audio signal from a media player, the audio signal also being received wirelessly by headphones of a user of the monitoring device.

18 Claims, 7 Drawing Sheets

Related U.S. Application Data continuation of application No. 16/660,633, filed on Oct. 22, 2019, now Pat. No. 10,963,911, which is a continuation of application No. 16/403,204, filed on May 3, 2019, now Pat. No. 10,572,896, which is a division of application No. 14/175,811, filed on Feb. 7, 2014, now abandoned, which is a continuation of application No. 13/914,870, filed on Jun. 11, 2013, now abandoned, which is a continuation of application No. 12/954,604, filed on Nov. 24, 2010, now abandoned, which is a division of application No. 11/139,330, filed on May 26, 2005, now abandoned.

(60) Provisional application No. 60/574,836, filed on May 27, 2004.

(51) Int. Cl.
*H04L 65/611* (2022.01)
*H04L 65/75* (2022.01)
*H04L 67/50* (2022.01)
*H04H 60/33* (2008.01)

(52) U.S. Cl.
CPC .......... *H04L 65/765* (2022.05); *H04L 67/535* (2022.05); *H04H 60/33* (2013.01)

(56) References Cited

U.S. PATENT DOCUMENTS

| | | | |
|---|---|---|---|
| 4,697,209 | A | 9/1987 | Kiewit et al. |
| 5,095,382 | A | 3/1992 | Abe |
| 5,210,366 | A | 5/1993 | Sykes, Jr. |
| 5,404,161 | A | 4/1995 | Douglass et al. |
| 5,436,653 | A | 7/1995 | Ellis et al. |
| 5,437,050 | A | 7/1995 | Lamb et al. |
| 5,512,933 | A * | 4/1996 | Wheatley ............ H04H 60/372 725/19 |
| 5,581,658 | A | 12/1996 | O'Hagan et al. |
| 5,594,934 | A | 1/1997 | Lu et al. |
| 5,758,257 | A | 5/1998 | Herz et al. |
| 5,844,938 | A | 12/1998 | Hupp et al. |
| 5,945,988 | A | 8/1999 | Williams et al. |
| 6,513,161 | B2 | 1/2003 | Wheeler et al. |
| 6,990,453 | B2 | 1/2006 | Wang et al. |
| 7,038,619 | B2 | 5/2006 | Percy et al. |
| 7,284,255 | B1 | 10/2007 | Apel et al. |
| 7,444,353 | B1 | 10/2008 | Chen et al. |
| 7,483,975 | B2 * | 1/2009 | Kolessar ............ H04H 60/44 709/224 |
| 7,634,787 | B1 | 12/2009 | Gebhardt et al. |
| 7,779,415 | B2 | 8/2010 | Bisdikian et al. |
| 8,131,389 | B1 | 3/2012 | Hardwick et al. |
| 8,296,791 | B2 | 10/2012 | Steuer et al. |
| 8,510,768 | B2 | 8/2013 | Steuer et al. |
| 8,677,389 | B2 | 3/2014 | Steuer et al. |
| 8,756,622 | B2 | 6/2014 | Steuer et al. |
| 10,719,848 | B2 | 7/2020 | Steuer et al. |
| 10,719,849 | B2 | 7/2020 | Steuer et al. |
| 10,963,911 | B2 | 3/2021 | Steuer et al. |
| 2002/0010919 | A1 | 1/2002 | Lu et al. |
| 2002/0038456 | A1 * | 3/2002 | Hansen ............ H04N 21/2187 348/E7.071 |
| 2002/0059577 | A1 | 5/2002 | Lu et al. |
| 2002/0072982 | A1 | 6/2002 | Barton et al. |
| 2002/0083060 | A1 * | 6/2002 | Wang .................... G11B 27/28 |
| 2002/0161741 | A1 | 10/2002 | Wang et al. |
| 2003/0009469 | A1 | 1/2003 | Platt et al. |
| 2003/0135623 | A1 | 7/2003 | Schrempp et al. |
| 2003/0177488 | A1 | 9/2003 | Smith et al. |
| 2004/0001161 | A1 | 1/2004 | Herley |
| 2004/0034441 | A1 | 2/2004 | Eaton et al. |
| 2004/0048637 | A1 | 3/2004 | Atkinson |
| 2004/0055445 | A1 | 3/2004 | Iyoku et al. |
| 2004/0122679 | A1 | 6/2004 | Neuhauser et al. |
| 2004/0224638 | A1 | 11/2004 | Fadell et al. |
| 2005/0086682 | A1 | 4/2005 | Burges et al. |
| 2006/0059277 | A1 | 3/2006 | Zito et al. |
| 2007/0143777 | A1 | 6/2007 | Wang |
| 2007/0168409 | A1 | 7/2007 | Cheung |
| 2008/0154401 | A1 | 6/2008 | Wang |
| 2019/0259056 | A1 | 8/2019 | Steuer et al. |

FOREIGN PATENT DOCUMENTS

| | | |
|---|---|---|
| WO | 2004030341 A1 | 4/2004 |
| WO | 2004040475 A2 | 5/2004 |
| WO | 2004044820 A1 | 5/2004 |
| WO | 2004077430 A1 | 9/2004 |
| WO | 2005006768 A1 | 1/2005 |
| WO | 2005036877 A1 | 4/2005 |

OTHER PUBLICATIONS

Hedges, "New measurement devices raise new questions. Will we ever know who's listening?" ftm, www.follwthemedia.com/number/devices01082004.htm, Aug. 1, 2004, 5 pages.
Nielsen Media Research, "Summary Report of the Active/Passive (A/P) Meter Regional Test," Nov. 11, 2002, 26 pages.
Gertner, "Our Ratings, Ourselves," Watching What You Watch, The New York Times Magazine, Apr. 10, 2005, 17 pages.
Arbitron, "The Portable People Meter System," Portable People Meter, www.arbitron.com/protable_people_meters/ppm_system.htm, 2004, 4 pages.
Nielsen Media Research, "Active/Passive Metering begins Jul. 2004," Client Communications, Aug. 6, 2003, 3 pages.
Philips, "Audio Fingerprinting for automatic music recognition," Philips Research brochure, www.researchphilips.com, 2 pages.
Schoneberg, Gfk AG, "Gfk unveils its multi-talented new MediaWatch," Press info, Jun. 14, 2004, 2 pages.
International Search Report and Written Opinion, International Application No. PCT/US05/18934, mailed Oct. 26, 2006, 14 pages.
European Search Report, European Application No. 05755114.5, dated Oct. 8, 2013, 3 pages.
File History of U.S. Appl. No. 60/547,931, filed Feb. 26, 2004.
File History of U.S. Appl. No. 12/283,354, filed Sep. 11, 2008.
Vavreck, L. et al., Closing the Marketing Loop: Measuring Real World Clickthrough and Conversion for King Kong, 1st Annual Audience Measurement Symposium, 13 pages.
Ex Parte Reexamination Control No. 90/019,375, filed Jan. 16, 2024.

* cited by examiner

470 Channel Data for "radio 35"

| row | start time | end time | content ID |
|---|---|---|---|
| 1 | C(0) | C(0)+6 | song21 |
| 2 | C(0)+6 | C(0)+8 | ad49 |
| 3 | C(0)+8 | C(0)+13 | song35 |

480 Channel Data for "album 12"

| row | start time | end time | content ID |
|---|---|---|---|
| 1 | C(0) | C(0)+7 | song51 |
| 2 | C(0)+7 | C(0)+13 | song72 |
| 3 | C(0)+13 | C(0)+23 | song65 |
| 4 | C(0)+23 | C(0)+30 | song29 |

490 Clean Play List

| row | start log time | end log time | content ID | Channel ID |
|---|---|---|---|---|
| 1 | $t_0$ | $t_0+7$ | song51 | album12 |
| 2 | $t_0+7$ | $t_0+13$ | song71 | album12 |
| 3 | $t_0+13$ | $t_0+20$ | song65 | album12 |
| 4 | $t_0+20$ | $t_0+26$ | song21 | radio35 |
| 5 | $t_0+26$ | $t_0+28$ | ad49 | radio35 |
| 6 | $t_0+28$ | $t_0+30$ | song34 | radio35 |

410 Raw Play Stream

| row | log time | content ID |
|---|---|---|
| 1 | $t_0$ | song 51 |
| 2 | $t_0+1$ | none |
| 3 | $t_0+2$ | song51 |
| 4 | $t_0+3$ | song51 |
| 5 | $t_0+4$ | movie 81 |
| 6 | $t_0+5$ | song51 |
| 7 | $t_0+6$ | song51 |
| 8 | $t_0+7$ | song72 |
| 9 | $t_0+8$ | song72 |
| 10 | $t_0+9$ | none |
| 11 | $t_0+10$ | song72 |
| 12 | $t_0+11$ | song72 |
| 13 | $t_0+12$ | song72 |
| 14 | $t_0+13$ | song65 |
| 15 | $t_0+14$ | song65 |
| 16 | $t_0+15$ | TVprgm58 |
| 17 | $t_0+16$ | song65 |
| 18 | $t_0+17$ | song65 |
| 19 | $t_0+18$ | song65 |
| 20 | $t_0+19$ | song65 |
| 21 | $t_0+20$ | song21 |
| 22 | $t_0+21$ | song21 |
| 23 | $t_0+22$ | song21 |
| 24 | $t_0+23$ | song21 |
| 25 | $t_0+24$ | song21 |
| 26 | $t_0+25$ | song21 |
| 27 | $t_0+26$ | ad49 |
| 28 | $t_0+27$ | ad49 |
| 29 | $t_0+28$ | song81 |
| 30 | $t_0+29$ | song35 | ssd = "sample sequence data"

450 Clean Play Stream

| row | log time | content ID |
|---|---|---|
| 1 | $t_0$ | song 51 |
| 2 | $t_0+1$ | song51 |
| 3 | $t_0+2$ | song51 |
| 4 | $t_0+3$ | song51 |
| 5 | $t_0+4$ | song51 |
| 6 | $t_0+5$ | song51 |
| 7 | $t_0+6$ | song51 |
| 8 | $t_0+7$ | song72 |
| 9 | $t_0+8$ | song72 |
| 10 | $t_0+9$ | song72 |
| 11 | $t_0+10$ | song72 |
| 12 | $t_0+11$ | song72 |
| 13 | $t_0+12$ | song72 |
| 14 | $t_0+13$ | song65 |
| 15 | $t_0+14$ | song65 |
| 16 | $t_0+15$ | song65 |
| 17 | $t_0+16$ | song65 |
| 18 | $t_0+17$ | song65 |
| 19 | $t_0+18$ | song65 |
| 20 | $t_0+19$ | song65 |
| 21 | $t_0+20$ | song21 |
| 22 | $t_0+21$ | song21 |
| 23 | $t_0+22$ | song21 |
| 24 | $t_0+23$ | song21 |
| 25 | $t_0+24$ | song21 |
| 26 | $t_0+25$ | song21 |
| 27 | $t_0+26$ | ad49 |
| 28 | $t_0+27$ | ad49 |
| 29 | $t_0+28$ | song35 |
| 30 | $t_0+29$ | song35 |

Clean Playstream

| row | log time | content ID | content offset |
|---|---|---|---|
| 1 | $t_0$ | TVprgm 27 | (0) |
| 2 | $t_0+1$ | TVprgm 27 | (0)+1 |
| 3 | $t_0+2$ | none | n/a |
| 4 | $t_0+3$ | none | n/a |
| 5 | $t_0+4$ | none | n/a |
| 6 | $t_0+5$ | TVprgm 27 | (0)+2 |
| 7 | $t_0+6$ | TVprgm 27 | (0)+3 |
| 8 | $t_0+7$ | TVprgm27 | (0)+9 |
| 9 | $t_0+8$ | TVprgm27 | (0)+10 |
| 10 | $t_0+9$ | TVprgm27 | (0)+9 |
| 11 | $t_0+10$ | TVprgm27 | (0)+10 |
| 12 | $t_0+11$ | none | n/a |
| 13 | $t_0+12$ | TVprgm27 | (0)+29 |
| 14 | $t_0+13$ | TVprgm27 | (0)+30 |
| 15 | $t_0+14$ | ad23 | (0) |
| 16 | $t_0+15$ | none | n/a |
| 17 | $t_0+16$ | ad25 | (0)+2 |
| 18 | $t_0+17$ | TVprgm28 | (0) |
| 19 | $t_0+18$ | TVprgm28 | (0)+1 |
| 20 | $t_0+19$ | TVprgm28 | (0)+2 |

560

Clean Play List

| row | start log time | end log time | content ID | content offset |
|---|---|---|---|---|
| 1 | $t_0$ | $t_0+2$ | TVprgm27 | (0) |
| 2 | $t_0+2$ | $t_0+5$ | none | n/a |
| 3 | $t_0+5$ | $t_0+7$ | TVprgm27 | (0)+2 |
| 4 | $t_0+7$ | $t_0+9$ | TVprgm27 | (0)+9 |
| 5 | $t_0+9$ | $t_0+11$ | TVprgm27 | (0)+9 |
| 6 | $t_0+11$ | $t_0+12$ | none | n/a |
| 7 | $t_0+12$ | $t_0+14$ | TVprgm27 | (0)+29 |
| 8 | $t_0+14$ | $t_0+15$ | ad23 | (0) |
| 9 | $t_0+15$ | $t_0+16$ | none | n/a |
| 10 | $t_0+16$ | $t_0+17$ | ad25 | (0)+2 |
| 11 | $t_0+17$ | $t_0+20$ | TVprgm28 | (0) |

570

Channel Data for TV C4

| row | start time | end time | content ID |
|---|---|---|---|
| 1 | C(0) | C(0)+31 | TVprgm27 |
| 2 | C(0)+31 | C(0)+34 | ad23 |
| 3 | C(0)+34 | C(0)+37 | ad24 |
| 4 | C(0)+37 | C(0)+40 | ad25 |
| 5 | C(0)+40 | C(0)+50 | TVprgm28 |

590

Clean Play List with Deduced Actions

| row | log time | end log time | content ID and <deduced action> | content offset |
|---|---|---|---|---|
| 1 | $t_0$ | $t_0+2$ | TVprgm27 | (0) |
| 2 | $t_0+2$ | $t_0+5$ | <pause for 3 units> | n/a |
| 3 | $t_0+5$ | $t_0+7$ | TVprgm27 | (0)+2 |
| 4 | $t_0+7$ | $t_0+7$ | <skip frwrd 5 units> | n/a |
| 5 | $t_0+7$ | $t_0+9$ | TVprgm27 | (0)+9 |
| 6 | $t_0+9$ | $t_0+9$ | <skip bckwrd 2 units> | n/a |
| 7 | $t_0+9$ | $t_0+11$ | TVprgm27 | (0)+9 |
| 8 | $t_0+11$ | $t_0+12$ | <fast frwrd 18 units> | n/a |
| 9 | $t_0+12$ | $t_0+14$ | TVprgm27 | (0)+29 |
| 10 | $t_0+14$ | $t_0+15$ | ad23 | (0) |
| 11 | $t_0+15$ | $t_0+16$ | <fast frwrd 7 units> | n/a |
| 12 | $t_0+16$ | $t_0+17$ | ad25 | (0)+2 |
| 13 | $t_0+17$ | $t_0+20$ | TVprgm28 | (0) |

FIG. 5

MEDIA USAGE MONITORING AND MEASUREMENT SYSTEM AND METHOD

CROSS REFERENCE TO RELATED APPLICATIONS

This is a continuation of U.S. patent application Ser. No. 17/199,355 filed on Mar. 11, 2021 which is continuation of U.S. patent application Ser. No. 16/660,633 filed Oct. 22, 2019 which is continuation of U.S. patent application Ser. No. 16/403,204, filed May 3, 2019, which is a divisional of U.S. patent application Ser. No. 14/175,811, filed Feb. 7, 2014, which is a continuation of U.S. patent application Ser. No. 13/914,870, filed Jun. 11, 2013, which is a continuation of U.S. patent application Ser. No. 12/954,604, filed Nov. 24, 2010, which is a divisional of U.S. patent application Ser. No. 11/139,330, filed May 26, 2005, which claims priority to U.S. Provisional Patent Application No. 60/574,836, entitled, "Open-ended device-independent media usage monitoring and measurement system," filed May 27, 2004. The contents of these applications is incorporated herein by reference.

BACKGROUND

Traditional media measurement systems have focused on directly monitoring channels being utilized by audience members. However, as media consumption patterns have become more complex, channel-centric media measurement is inadequate for many purposes. It may be desirable to track usage of particular media content independent of channel. Furthermore, although "channel" identification in a traditional media measurement system may sometimes be limited to radio or television broadcast station, it is increasingly desirable to track usage of media across several types of media delivery vehicles including radio, television, CD, DVD, computer download, portable media players (e.g. MP3 players, iPod), and other vehicles. Furthermore, with respect to tracking consumption of advertisements, it may be inadequate to simply track channel tuning, because, for example, an audience member may mute a broadcast during commercial periods. Thus simply identifying a broadcast channel does not adequately track whether the audience member listened to a particular advertisement.

Some media measurement systems have used codes to "tag" and track particular content. However, such systems are limited in that they can only track content that has been properly encoded.

With the development of more robust content recognition technologies, some content recognition systems have recently been deployed which do not rely on codes. For example, Philips, Shazam Entertainment, and others have marketed systems for identifying songs played into a mobile phone. Although such systems can be efficiently deployed in the context of song recognition, deploying such systems in the context of media measurement systems poses particular challenges. Continuous searching against a large database of media content can be computationally intensive. Furthermore, such systems, while increasingly robust, still return some erroneous results, particularly in high-noise environments.

At the same time, the media measurement context provides opportunities to utilize data exogenous to a particular audio or video data sample. Such opportunities have thus far been insufficiently exploited for the purpose of efficiently applying existing content recognition technologies in the media measurement context. Thus, an improved media measurement system and method is needed.

SUMMARY

Some embodiments of the present invention provide a media measurement system and method that enhances recognition (e.g. in terms of accuracy or efficiency) of the content of a media sample by analyzing information exogenous to the sample. Some embodiments of the present invention provide a media measurement system and method that utilizes audience data to enhance content identifications. Some embodiments analyze media player log data to enhance content identification. Other embodiments of the present invention analyze sample sequence data to enhance content identifications. Other embodiments analyze sequence data to enhance content identification and/or to establish channel identification. Yet other embodiments provide a system and method in which sample construction and selection parameters are adjusted based upon identification results. Yet other embodiments provide a method in which play-altering activity of an audience member is deduced from content offset values of identifications corresponding to captured samples. Yet other embodiments provide a monitoring and measurement system in which a media monitoring device is adapted to receive a wireless or non-wireless audio signal from a media player, the audio signal also being received wirelessly by headphones of a user of the monitoring device.

BRIEF DESCRIPTION OF THE DRAWINGS

The novel features of the invention are set forth in the appended claims. However, for purpose of explanation, several aspects of particular embodiments of the invention are described by reference to the following figures.

FIG. 3 illustrates an embodiment consistent with aspects of the present invention.

FIG. 4 illustrates a raw play stream generated by a process such as step 207 of FIG. 2; a clean play stream and clean play list generated by a scrubbing step such as step 209 of FIG. 2 or steps 301, 302, or 305 of FIG. 3; and channel data associated with two channels.

FIG. 5 illustrates a clean play stream, clean play list, channel data, and a clean play list showing deduced play-altering actions. The illustrated data may be generated by systems and methods in accordance with an embodiment of the present invention such as, for example, system 100 of FIG. 1 method 200 of FIG. 2, and method 300 of FIG. 3.

DETAILED DESCRIPTION

The following description is presented to enable any person skilled in the art to make and use the invention, and is provided in the context of particular applications and their requirements. Various modifications to the exemplary embodiments will be readily apparent to those skilled in the art, and the generic principles defined herein may be applied to other embodiments and applications without departing from the spirit and scope of the invention. Thus, the present invention is not intended to be limited to the embodiments shown, but is to be accorded the widest scope consistent with the principles and features disclosed herein.

Figure 1:
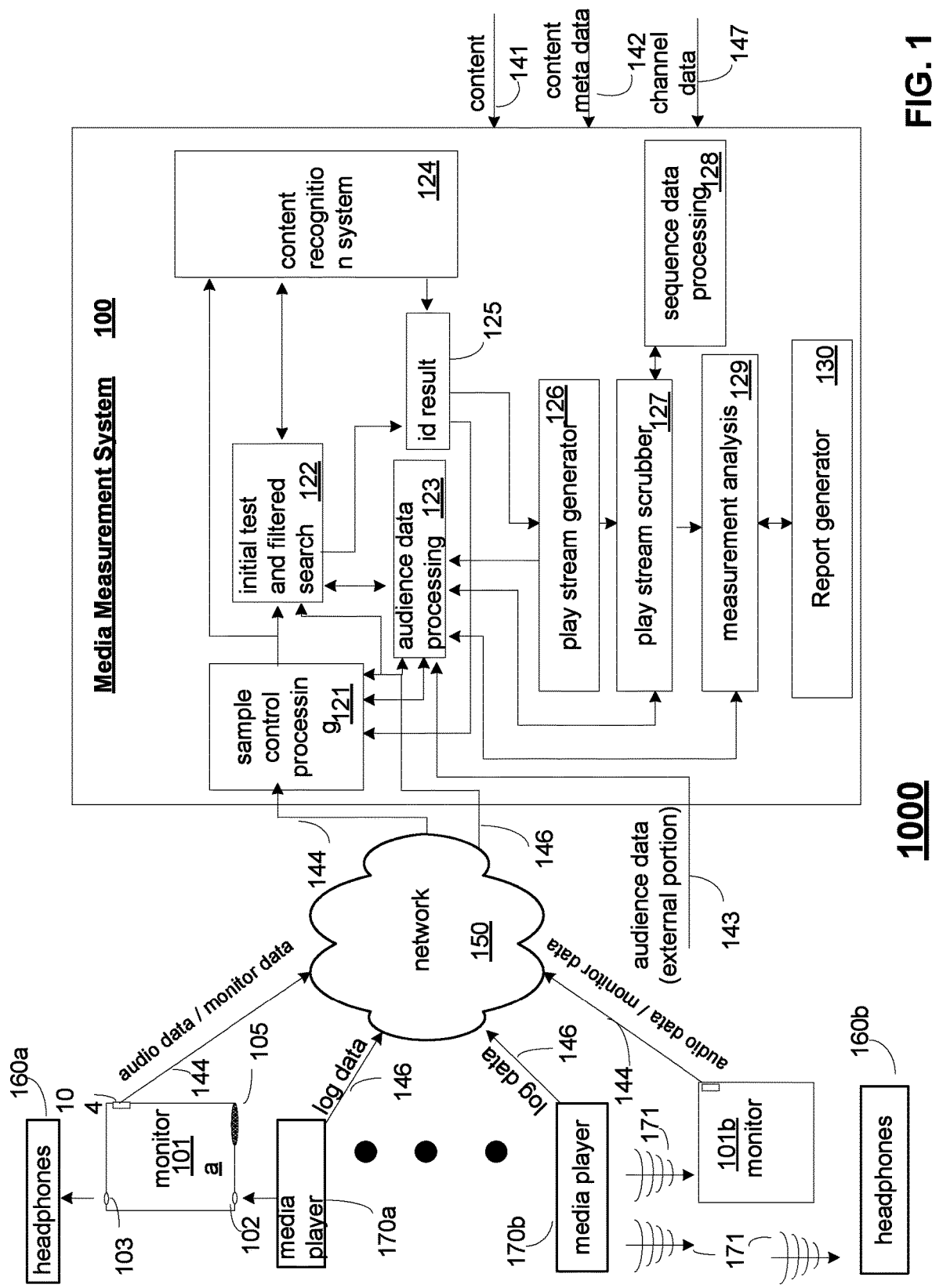
FIG. 1 illustrates an exemplary media usage monitoring and measurement system in accordance with aspects of an embodiment of the present invention.

FIG. 1 illustrates an exemplary media usage monitoring and measurement system 1000. System 1000 includes media measurement system 100 and monitoring devices 101 in accordance with aspects of an embodiment of the present invention.

As illustrated, monitoring device 101*a* includes a microphone 105, a media player port 102, a headphone port 103, and a data upload port 104. A monitored audience member wears monitor 101*a* during a monitoring period. When the audience member is consuming media from media player 170*a* without the use of headphones 160*a* (i.e. if media player 170*a* has a speaker), monitor 101 captures audio energy acoustically through microphone 105. However, when the audience member desires to use headphones 160*a* to receive media content from media player 170*a* (e.g. an MP3 player, iPod, CD player, DVD player, television, radio, computer, or other media player) he or she can plug headphones 160*a* into headphone port 103 and plug media player 170*a* into media player port 102. In that case, monitor 101*a* captures audio energy through media player port 102. Microphone 105 includes a microphone and associated microphone port. However, in alternatives, a monitor may simply have a microphone port into which a microphone may be plugged or linked via wireless connection. Thus the term "microphone port" will herein refer to any electronics capable of receiving energy captured through a microphone, whether or not a microphone is built into the monitoring device itself.

As another example, headphones 160*b* are adapted to receive a content signal 171 via wireless transmission 171 from media player 170*b*. Monitor 101*b* is adapted to receive the same content signal 171 from media player 170*b*. In some embodiments, a syncing process allows monitor 101*b* to adapt along with headphones 160*b* and media player 170*b* to changes in signal 171 so that monitor 101*b* continues to receive the same signal as headphones 160*b*. In some embodiments, syncing may be accomplished via a wireless and/or automatic process, such as providing a monitor that responsively changes tuning based on tuning changes between the media player and the headphones.

Audio data captured by monitors 101, along with associated monitor data (e.g. device ID) (collectively, "audio data/monitor data" 144) may be uploaded to system 100 through upload port 104, directly, via memory device transfer (e.g. flash memory card, floppy disk, CD, etc.) or through a network such as network 150. The audio data uploaded from a monitor 101 may be raw audio data, or may be audio data that has undergone one of a variety of levels of processing prior to upload. For example, the uploaded audio data may include parameters useable to calculate audio signatures (sometimes referred to as audio fingerprints) and landmarks or other values useful in the content recognition process. Alternatively, the audio data may comprise pre-calculated signatures, landmarks, or other data useful for content recognition. On the other hand, in some embodiments, the uploaded audio data may simply represent a raw signal corresponding to audio energy received at monitor 101.

System 100 is adapted to receive some audience data 143 externally. For example, audience data collected by systems and associated monitors other than those of system 1000 may be utilized by system 100; data based on externally collected and/or externally analyzed demographic, psychographic, or other audience related data might also be received as part of external audience data portion 143. Other audience data may be generated internally by audience data processing module 123 alone or in combination with measurement analysis module 129 and/or other system components.

Also, system 100 is adapted to receive media player log data 146. Media player log data 146 may be generated by a media player such as media player 170*a* or 170*b* and sent to system 100 through direct connection, memory device transfer or via network 150. Also, a third party might collect such log data which then may be made available through direct connection, memory device transfer, or via network 150. Media player log data 146 includes data logging content played on the media player from which the log data was generated. Although log data 146 does not necessarily reflect what content was actually heard, to the extent the media player generating the log data is used primarily by the audience member associated with the corresponding monitor 101, it can provide a useful basis for initial testing of captured content as will be described further below.

System 100 is also adapted to receive known content 141 and content meta data 142. Content 141 may include media files associated with a known piece of media content (e.g. a song, movie, commercial, television show, video game, etc.). However, it will be understood by those skilled in the art that "content" in the sense of the known content 141 received by system 100 may, in some embodiments, simply refer to data about signals representing the content and does not necessarily refer to a stored version of the media content itself; e.g. "content" may be stored signatures and landmarks derivable from a song's audio, but not necessarily an audio file useable to play the song itself. On the other hand, in other embodiments, a system such as system 100 may be adapted to receive a useable audio file and then derive data from that file such as signatures, fingerprints, landmarks, etc. that may be readily searched during the content recognition process. Content meta data 142 includes various data relating to content 141. For example, a portion of content 141 might include a particular song as recorded by a particular artist. Corresponding content meta data 142 for that song might include the various albums or other collections in which that song appears; various radio broadcasts (including station and broadcast times) playing the song; movies, advertisements or video games including the song; other songs that have sampled the song; and various other related information. In the context of a television program, meta data also might include, for example, segment identifications and corresponding time lengths. By distinguishing content data from content meta data in this manner, it is possible to store content data for a single content ID only once, and then add various pieces of meta data as appropriate. For example, a TV program, or program segment, might initially have meta data relating to particular broadcasts. However, at a later date, meta data might be added relating to, for example, a DVD version of the program, without needing to store the program content itself more than once.

Turning to the details of system 100, audio data and monitor data (e.g. device ID) is received at sample control processing module 121. Module 121 provides monitor data, portions of which might be audience data, to processing module 123. Module 121 also divides the audio data into samples and determines which samples should be submitted for further content recognition testing. In alternative embodiments, the audio data may already have been divided into samples prior to receipt by system 100 (e.g. at monitor 101). In such alternatives, a module such as module 121 might either use the provided divisions or combine the data and then re-divide it into samples as determined by the system. Module 121 may be used either to submit a sample to initial test and filtered search module 122 or to content recognition system 124.

Initial test and filtered search module 122 conducts one or more initial identification attempts. Several different types of initial identification attempts might be performed. Module 122 may test a captured sample against content associated with the most recently identified content. As another possible initial test, module 122 may test the sample against content identified from a media player log file. Another initial identification test may be carried out in a variety of ways. For example, filtered search module 122 might use audience data from audience data processing module 123 to form parameters and then pass those parameters to content recognition system 124 which then uses the parameters to conduct a filtered search of its content. Alternatively, module 122 might be adapted to utilize an instance of content recognition system 124 that includes content pre-selected based upon relevant audience data. Some examples of relevant audience data that may be used either to form search parameters or to construct targeted content include:

- age, gender, and other demographic information about the audience member (using the corresponding monitoring device) along with media consumption patterns of other persons sharing similar demographic characteristics
- media consumption patterns of the audience member based on questionnaire input or based on past content identifications associated with that audience member
- media consumption patterns of other audience members who have consumed other media content that has also previously been consumed by the audience member using the corresponding monitoring device
- location of the audience member (alone and/or relative to other audience members)

Of course, the above are just some examples of audience data that may be utilized by system 100.

After completing the initial identification attempt, filtered search module 122 passes the identification result to ID result module 125. If an identification has been made, the result is passed to play stream generator 126 and to sample control processing module 121. If no identification has been made, then content recognition system 124 performs a search using a larger portion of its content to identify the data sample. The result is passed to ID result module 125 which in turn passes the result to play stream generator 126 and to sample control module 121. Content recognition system 124 is adapted to implement one or more known content recognition methods that identify content by extracting parameters from a media signal and applying an algorithm to those parameters to search for a content match. Those skilled in the art will recognize that many such methods and algorithms exist. One such example is described in U.S. patent application Ser. No. 09/839,476 entitled "System and Methods for Recognizing Sound and Music Signals in High Noise and Distortion" by Wang et al. and published Jun. 27, 2002 with publication number US2002/0083060. Aspects of other such examples are described in the following published PCT applications by Koninklijke Philips Electronics N.V.: "Fingerprinting Multimedia Contents" (WO2004/044820, published May 27, 2004), "Fingerprint Extraction" (WO2004/030341 published Apr. 8, 2004), and "Improvements in and Relating to Fingerprint Searching" (WO2004/040475 published May 13, 2004). Such distinct methods and algorithms may have varying degrees of efficiency, accuracy, and applicability to certain types of content (or different settings of a particular algorithm might have different efficiency depending on content type). Thus, in some embodiments, a system such as system 100 may intelligently select among multiple such algorithms (or multiple settings of a single algorithm) based on expected content characteristics. For example, algorithm A might be faster and more accurate at identifying silence than algorithm B, and thus a system such as system 100 of FIG. 1 having a corresponding subsystem for content recognition (such as system 124) might achieve enhanced performance by submitting a sample for processing by algorithm A rather than algorithm B if recent identification results indicate silence. Other differences corresponding to content types (e.g. speaking audio versus music audio) might also be exploited based on prior content identification results to select a most efficient recognition algorithm from a plurality of algorithms. In such an alternative, if the algorithms required different audio data parameters, a monitor might send two sets of parameters for each sample corresponding to each algorithm and then the system would select between the two sets as needed. Alternatively, the two sets of parameters might be calculated by the system based on raw audio data received from a monitoring device.

Figure 3:
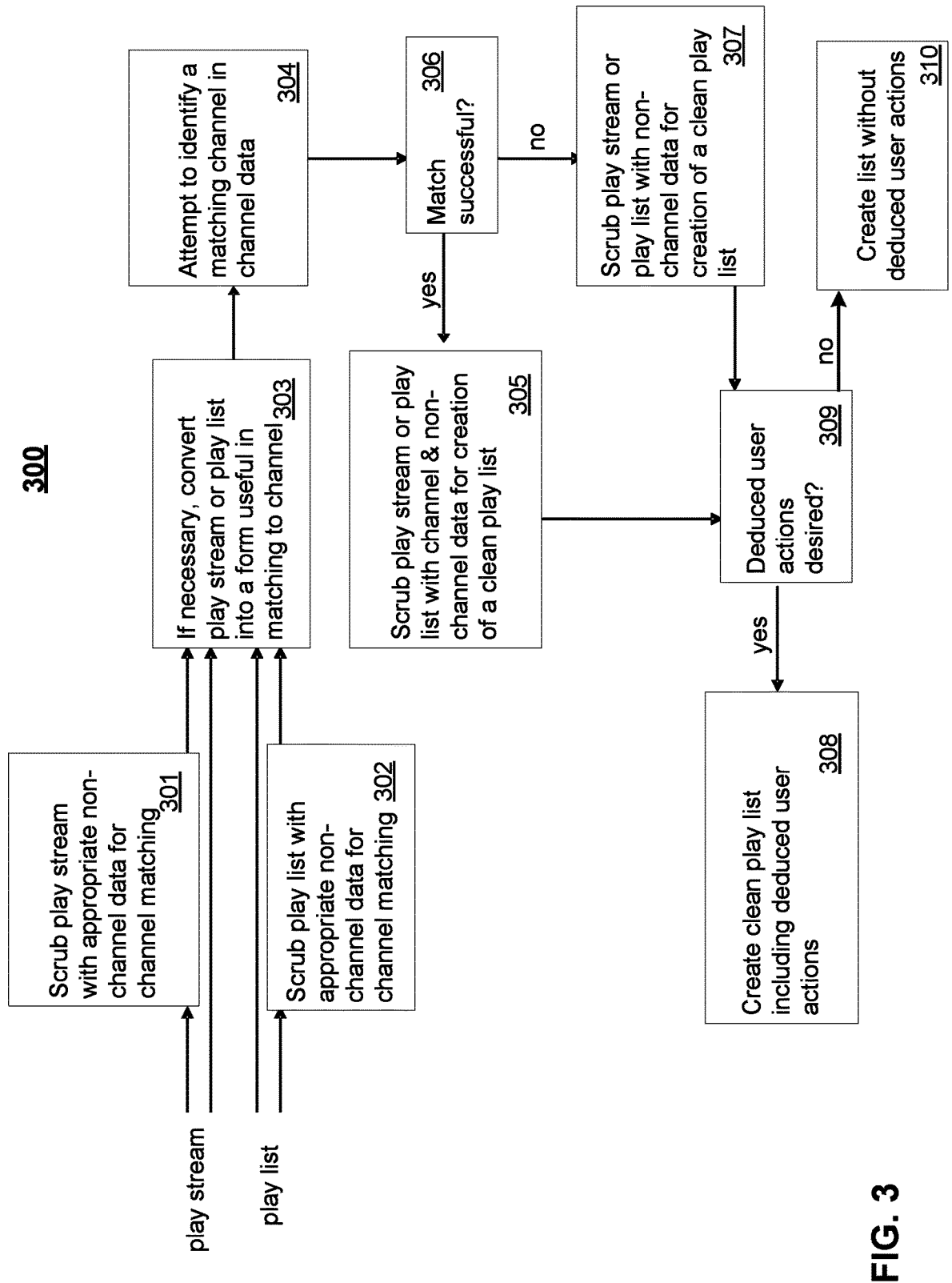
FIG. 3 illustrates a process for using and generating information such as that illustrated in FIG. 4 and FIG. 5

Play stream generator 126 generates a raw play stream relating a sequence of samples to content identification results (for an example of a portion of a raw play stream, see FIG. 3 and accompanying text). The raw play stream is then processed by play stream scrubber 127 which analyzes the sequence of sample identification results utilizing sequence data processing module 128. Based on analysis of sequence data and, where appropriate, analysis of audience data via interaction with audience data module 123, play stream scrubber 127 generates a clean play stream and clean play list (see FIG. 3 and accompanying text) which can then be used by measurement analysis module 129. Results of the media measurement analysis can be obtained via report generator 130.

In alternative embodiments, many of the system components and corresponding functions performed within a system such as system 100 might instead be implemented on the monitoring devices such as monitoring device 101. For example, many of the functions performed by sample control processing module 121 might instead be performed at a monitoring device. To cite but one example in more detail, if a monitoring device maintains an ongoing reciprocal connection to obtain sample identification results of a media measurement system, then the monitoring device can select which samples to send to the system for recognition analysis. The monitoring device might then also adjust parameters such as sample resolution, the length of a sample time window, and the recognition algorithm selected. This is just one example of how the illustrated embodiment might be modified to shift system components from a central system to a monitoring device. Many other such variations will be apparent to those skilled in the art.

Also, it will be understood that although FIG. 1 illustrates a particular exemplary division and relationship between "modules," the division illustrated may be readily modified without departing from the spirit and scope of the present invention. For example, in various implementations, the illustrated modules may be combined into larger modules or the functions performed may be distributed across several modules. The term "module" and the associated illustrated division of system components is chosen for purposes of ease of description only and does not limit how particular systems consistent with the present invention might be constructed.

Figure 2:
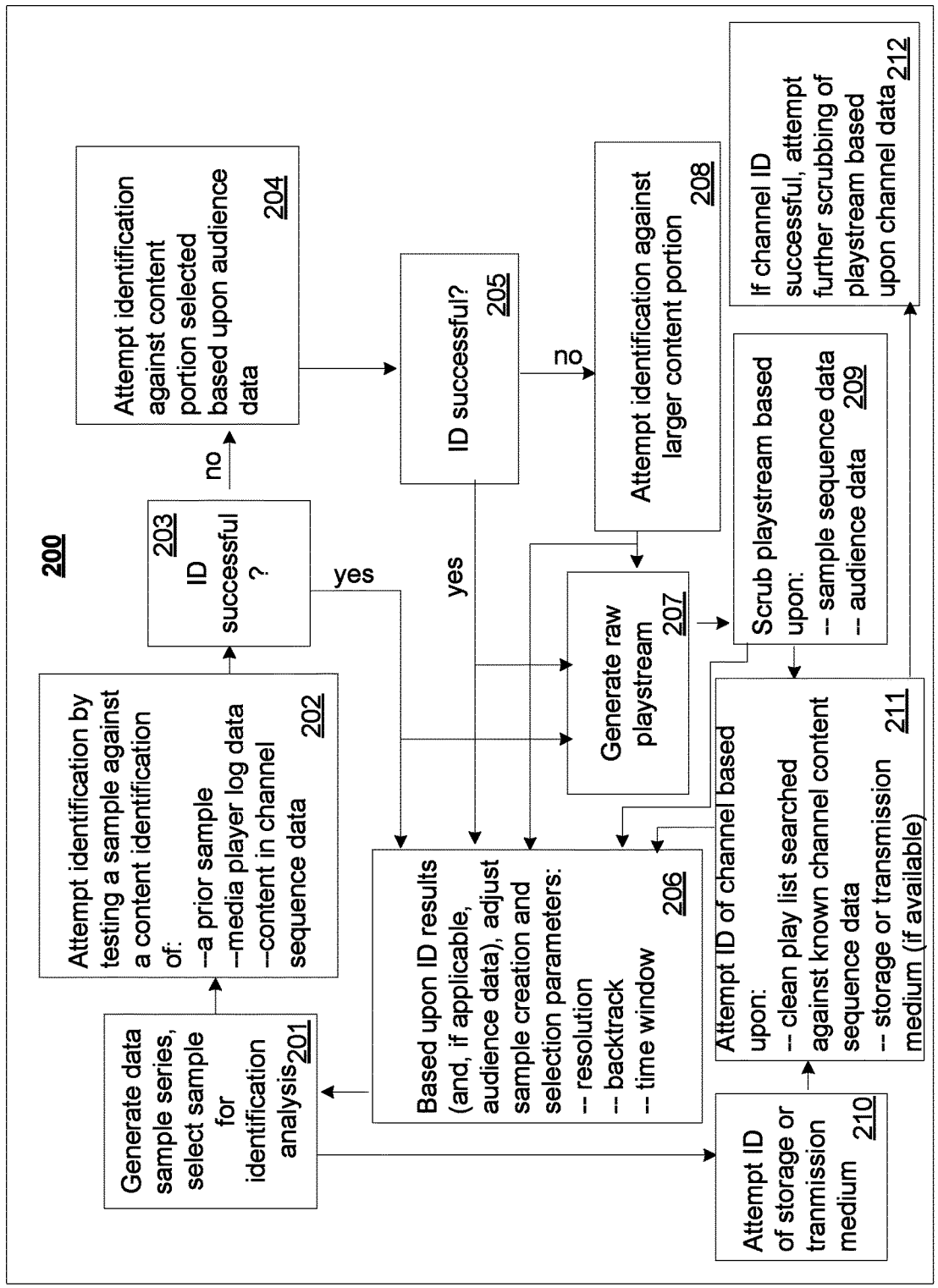
FIG. 2 illustrates a media measurement method in accordance with aspects of an embodiment of the present invention.

FIG. 2 illustrates a media measurement method 200 in accordance with aspects of an embodiment of the present invention. One or more elements of method 200 may be carried out, for example, by system 100 of FIG. 1 or other similar systems. At step 201, method 200 receives audio data from a monitoring device. Step 201 caches a series of samples and determines the sample resolution with which samples are submitted for content identification. In particular, as described further below (see FIG. 4 and accompanying text), sample resolution refers to how many samples in a given sequence of samples are processed for content identification. Step 201 also determines length, or "time window" of each sample.

At step 210, characteristics of the audio data are analyzed to attempt to identify the source of transmission or storage of the media played by an individual based on audio characteristics of that signal. For example, the process attempts to recognize particular types of encoding or compression, or identifies sound associated with screen refresh on a television or computer monitor, or recognizes compression or frequency range of FM or AM radio, or CD or DVD. If the storage or transmission medium is identified, the results of step 210 can be added to a play list and/or utilized in step 211 to identify channel (see below for further description of step 211).

At step 202, identification of a sample in a series of samples is attempted via initial test methods. In particular, step 202 determines whether the audio data in the tested sample matches data associated with the content ID corresponding to the most recently identified sample. Step 202 may also or instead test the sample against content IDs obtained using data from a media player log file associated with the audience member using the corresponding media monitor. Step 203 determines whether successful identification occurred at step 202. If yes, then the identification result is provided to step 206 and 207. If no, then step 204 searches for a content match against targeted content selected based at least in part upon additional audience data. Step 205 determines whether step 204 obtained an identification. If yes, then the identification result is provided to steps 206 and 207. If no, then step 208 searches for a content match against a larger portion of the content. With respect to steps 202, 204, and 208, there are two possible results: an identification has been made or no identification has been made. No identification at steps 202 and 204 leads to the further identification attempt at step 208. Whatever the result is at step 208 (identification or no identification) that result is passed to steps 207 and 206.

At step 206, an identification result is used to adjust sampling control and selection parameters for one or more subsequent samples. Parameters that might be adjusted include resolution, backtrack selection, sample time window, or recognition algorithm selected. For example, if a sample has been identified successfully, and the identification indicates a match with the prior sample, the sampling resolution might be decreased from ⅕ to ⅒, meaning that, in a sequence of samples, nine samples rather than four are skipped before selecting the next sample to analyze for identification. As another example, if an identification result does not match the result of the prior sample identified, then step 206 might initiate a back track analysis and select an intervening sample that has not yet been analyzed. Step 201 would then pass the sample selected from backtracking to step 202 for attempted identification. As another example, resolution might be increased when recent identification results suggest an extended period of silence or absence of known content.

As yet another example, once media content for a limited series of samples has been identified, the time window size for each sample might be decreased from, for example, 5 seconds to 3 seconds. This would mean that samples submitted for attempted identification would be shorter in length. This can create efficiencies because once the content is identified, the process needs only to detect a change in content, and this can, in some cases, be accomplished utilizing a smaller amount of audio data, thereby preserving system resources.

Adjustment of sampling parameters is described further below in the context of FIG. 5 and accompanying text.

Continuing with the description of FIG. 2, step 207 generates a raw play stream indicating a series of samples and corresponding identification results. Step 209 scrubs the raw play stream based upon sample sequence data (described further below in the context of FIGS. 3-4 and accompanying text) and based upon audience data. The resulting clean play stream may be converted to a play list listing the content captured and indicating the order in which it was captured. Step 209 attempts to identify the channel by searching known channel data to find an apparent content sequence match to the play list. If the storage or transmission medium of the captured sample has been identified at step 210, that information may be made available for step 211 and allows step 211 to use that information to filter its search of channel data (e.g., only search channel data including CD channels, or only including radio broadcast channels, etc.). If step 211 successfully identifies the channel, information such as content sequence data for the identified channel may be used by step 212 to further scrub or rescrub the play stream, particularly with respect to any apparently incorrect content identifications that could not be corrected based upon sample sequence data as utilized in step 209.

FIG. 3 illustrates a process 300 for using and generating information such as that illustrated in FIG. 4 and FIG. 5. Some of the functions accomplished by process 300 are similar to functions accomplished by steps 207, 209, 211, and 212 of FIG. 2. Process 300 illustrates a more detailed example of an embodiment consistent with aspects of the present invention.

Referring to process 300, depending on available information, either a play stream is made available to step 301 or a play list is made available to step 302. Step 301 prepares a play stream for further processing necessary for channel matching by scrubbing (i.e. reviewing for missing or incorrect data) the play stream using non-channel data. Step 302 prepares a play list for further processing necessary for channel matching by scrubbing (i.e. reviewing for missing or incorrect data) the play list using non-channel data. With respect to steps 301 and 302, the non-channel data selected might be selected particularly for the purpose of better preparing the play stream or play list for a channel matching process. Step 303 receives either a raw (i.e. "not scrubbed") play stream or play list directly or receives a scrubbed play stream or play list from step 301 or 302. If necessary, step 303 converts received data to a format useful in matching to a channel (e.g. converts a play stream to a play list where a play list format is useful for channel matching, or converts a play stream or play list to a mathematical representation that is useful for channel matching).

Step 304 attempts to match the play stream or play list (or corresponding data format representing the play stream or play list) against known channel data to identify a channel (e.g., an album, samples of an album presented for marketing—e.g. on a web page—, radio broadcast, television broadcast, theater version of a movie, DVD version of a movie, etc.) associated with the elements of the play list or play stream. Step 306 determines whether a channel match was achieved. If yes, then step 305 uses channel data and non-channel data to scrub or further scrub the play stream or play list for purposes of creating a clean play list. If the play list or play stream has already been scrubbed with non-channel data in either step 301 and 302, then the play stream or play list may not need to be further scrubbed with non-channel data at step 305. In that case, step 305 just uses channel data to further scrub the play stream or play list. However, it is possible that scrubbing the play list or play stream with non-channel data for purposes of creating data useful for channel matching will be somewhat different than doing so for purposes of creating a clean play list, thus non-channel data is referenced again in the illustration of claim 305.

If step 306 determines that a channel match was not achieved at step 304, then step 307 scrubs the play stream or play list with non-channel data to create a clean play list. Step 309 determines whether including deduced user actions on the clean play list is desired. If yes, then step 308 creates a clean play list including deduced user actions. If no, then step 310 creates the clean play list without including deduced user actions.

FIG. 4 illustrates Raw Play Stream 410 generated by a process such as step 207 of FIG. 2; Clean Play Stream 450 and Clean Play List 490 generated by a scrubbing step such as step 209 of FIG. 2 or steps 301, 302, or 305 of FIG. 3; Channel Data 470 and Channel Data 490. Referring to FIG. 4, Raw Play Stream 410 itemizes a sequence of analyzed samples and relates that sequence to corresponding identification results in the content ID column. The content ID result indicates either a reference corresponding to a particular piece of content or indicates that no identification was made. The example in FIG. 4 assumes that no user play-altering activities took place and this example does not rely on content offset data in scrubbing the raw play stream to obtain a clean play list. However, note that in other examples, such as that of FIG. 5, sample sequence data ("ssd") includes content offset data. For purposes of presenting and analyzing sample sequence data as described herein, the times in list 410 may be relative to an arbitrary value (e.g. "t0") rather than representing an absolute time; however, in many instances, a log time will in fact indicate the actual time the sample started to be captured.

Sample sequence data may be used to "scrub" Raw Play Stream 410. By analyzing the sequence of data on Raw Play Stream, it is possible to locate and correct any identifications that are likely to be incorrect or to supply missing identifications where the system has not otherwise been able to provide an identification.

Sample sequence data can be used to derive portions of Clean Play Stream 450 from raw play list 410 in the following manner: Referring to Raw Play Stream 410, the content IDs associated with samples 1, 3, 4, 6, and 7 all indicate the same media content referenced as "song51." The content ID value associate with sample 2 indicates that no content has yet been successfully associated with that sample and the content ID value associated with sample 5 indicates "movie81." Given this pattern of sample sequence data, it is reasonable to assume that the person using the corresponding monitor listened to song51 through the time period associated with the audio data of samples 1-7, and thus, the "scrubbed" version of the play stream, i.e. Clean Play Stream 450, indicates song51 for each of samples 1-7.

Information about the sequence of content in a play stream can be used to generate a play list and identify a channel, and the identified channel data can also potentially be used to help further "scrub" a play stream. For example, the sequence of consumed content represented on Play Stream 450 is searched against known channel data (e.g. particular CD albums, broadcasts, or other particular storage or transmission media carrying a particular sequence of content). In this example, simplified for illustrative purposes, known channel data includes channel data 470, associated with channel ID "radio 35," and channel data 480, associated with channel ID "album12." Referring to channel data 470, each row relates a content ID to a start time and end time. In this example, start and end times are referenced with respect to an arbitrary start time value "C(0)." For some channels (e.g. CDs, DVDs, video games) only such arbitrary reference times will be available. For other channels (e.g. broadcasts, concerts, etc.), absolute time might be both available and useful. However, for the purpose of the analysis illustrated in this example, times that are relative only and not necessarily absolute are sufficient.

With respect to further "scrubbing" the Raw Play Stream 410, in this example, channel data may be used to correct the apparent misidentification of sample 29. Note that the sample sequence data alone in this example does not provide a clear basis for correcting sample 29. Sample 28 is identified as "ad49," sample 29 as "song81," and sample 30 as "song 35." However, given the sequence "song21, ad49, and song35" is associated with a known sequence of the radio broadcast referenced as "radio 35," there is a basis in channel data 470 for believing that the proper content ID for sample 29 is "song35" rather than "song81." Thus, Clean Play Stream 450 indicates a change relative to Raw Play Stream 410 with respect to the content ID for sample 29. Note that a clean play stream and clean play list are not necessarily generated sequentially. For example, to the extent a channel identification and associated channel data are necessary to "scrub" a raw play stream, portions of a clean play list may be determined as part of obtaining data necessary to make channel selection. In the present example, "radio 35" is identified based on a particular content sequence, and that information helps populate Clean Play Stream 450 with a corrected content ID value for sample 29 relative to the sample 29 content ID value on Raw Play Stream 410.

Audience data may also be used in the "scrubbing" process. For example, if "song81" is radically different from the user's known consumption habits and "song35" is within the user's known consumption habits, another basis might be provided for suspecting that "song35" rather than "song81" is the correct content ID for sample 29 of Play Stream 410.

It will be understood by those skilled in the art that in the context of data sets that might, in alternative examples, make up a "raw play stream," "a clean play stream," or a "clean play list," the particular organization, division, and content of the data may vary considerably from that illustrated in FIG. 4 (as well as that illustrated in FIG. 5 below) without departing from the spirit and scope of the present invention. To cite but one example, such play streams and/or play lists might include several data fields in addition to those illustrated. Moreover, the illustrated data sets might not be collected in the same table but, depending upon database architecture, might be spread out in different tables and/or relational structures. Furthermore, the data sets similar to those illustrated might not be stored at all in a database but rather might be generated on the fly and then discarded as mere intermediate steps to generating a particular report that the system is asked to produce. These and other variations will be readily apparent to those skilled in the art. The examples shown are chosen primarily for usefulness in illustrating aspects of a particular embodiment. While they are useful in illustrating certain underlying principles of certain aspects of the present invention, they should not be considered, in and of themselves, to limit the scope of the invention.

FIG. 5 illustrates Clean Play Stream 510, Clean Play List 560, Channel Data 570, and Clean Play List 590 showing deduced play-altering actions. The illustrated data may be generated by systems and methods in accordance with an embodiment of the present invention such as, for example, system 100 of FIG. 1 method 200 of FIG. 2, and method 300 of FIG. 3. Aside from the traditional time shifting activity of, for example, recording a television broadcast and playing it at a later time, various play-altering activities may be undertaken by an audience member. For example a media player may be paused, reversed, fast forwarded, and some media players have modes in which skipping back or forward in played content can occur almost instantly, including within the smallest time division useful for a particular data set (e.g., less than five seconds, less than one second, etc.). Generally, these activities of manipulating the pace and order in which media is consumed will be referenced as audience play-altering actions or activities. These activities may be deduced, for example, during scrubbing step 209 of FIG. 2, or, as illustrated more expressly, during step 308 of FIG. 3.

Continuing with the description of FIG. 5, Play Stream 510 presents a series of log times, content IDs, and content offsets. In the illustrated example, times given in the log time column begins with to and ends with $t_0+19$. Each log time indicates a time at which capture of the analyzed sample began, where to simply represents a beginning time for samples on Play Stream 510. Each content ID indicates an identifier of the content that has been identified as corresponding to the captured sample. In the example illustrated, "TV program 27" refers to a TV program segment and "TV program 28" refers to another program segment of the same program. "Ad23" and "ad25," on the other hand, refer to separate advertisements. Each content offset value represents a time offset from the beginning of a particular piece of content. For example, row 8 of Play Stream 510 corresponds to a sample whose beginning is located 9 time units from the beginning of TV program 27, thus the content offset is referenced as (0)+9.

Play List 560 contains a row for each internally continuous media consumption event. The start log time and end log time for each such event are listed in each row. If an entire piece of content (e.g. a TV program segment, or an entire TV ad) is listened to without interruption, that would correspond to a row of Play List 560. On the other hand, if the data from Play Stream 510 suggests a discontinuity within consumption of a particular piece of content, such discontinuities form boundaries between consumption events that form rows of List 560. The meaning of these concepts may be clarified by discussing further details of the illustrated example.

Discontinuities in consumption of the identified media may be identified by comparing the progression of sample log times to progression of corresponding content offset times in Play Stream 510. For example, referring to rows 7 and 8 of play stream 510, log times progress from $t_0+6$ to $t_0+7$; however, the corresponding content offsets progress, with respect to the start of TV program 27, from (0)+3 to (0)+9. Had the media consumption from one sample to the next been continuous, one would expect that the second offset value (in row 8) would have been (0)+4 rather than (0)+9. Therefore, a boundary between media consumption events can be deduced. Thus, rows 3 and 4 of List 560 indicate two consumption events with respect to the same piece of media content (TV program 27). By contrast, row 1 and row 2 of Play Stream 510 are, on Play List 560, collapsed into a single row (row 1) because the content offset progression from row 1 to row 2 of Play Stream 510 suggests continuous consumption of the same piece of media content.

Referring to Play List 560, the "end log time" of one event also defines the "start log time" of the next event. In other examples, particularly if continuous time is not assumed, a play list might be constructed using start log times that are different than the end log time of the previous consumption event.

Referring to Clean Play List With Deduced Actions 590, it can be seen that a play list can be constructed that supplements the information in Play List 560 with information about the apparent actions of the audience member. Rows 2, 4, 6, 8, and 11 of List 590 include such information about deduced actions.

To the extent such play-altering actions occur within the same piece of content, audience member actions may be deduced without content sequence data for a particular channel. For example, referring to rows 2, 3, 4, 5, and 6, of Play Stream 510, the content offset values of rows 2 and 6 indicate advancing for one time unit within TV program 27 while no content ID (or corresponding offset value) is available for rows 3-5. From this information, and the fact that log times of rows 3-5 together correspond to progression through three time units, it is reasonable to deduce that the audience member paused a media player for three time units from log time $t_0+2$ to log time $t_0+5$. That deduced action is recorded in row 2 of Play List 590.

On the other hand, in other contexts, it may be necessary to refer to content sequence data for a particular channel to be sufficiently confident in deducing the details of an audience member's play-altering activity. For example, referring to Play Stream 510, data in rows 15-17 indicate one or more consumption discontinuities in which a play-altering action appears to have crossed a content boundary. Row 15 indicates consumption of the beginning of ad23; row 16 indicates no identified content, and row 17 indicates consumption of ad24 from a point two time units after the beginning of that ad. From this information alone, it is difficult or impossible to determine how much play-altering activity occurred and whether any content pieces were skipped altogether. However, content sequence data for an identified channel may be used to supplement the information gap. Data 570 lists content sequence data for a channel identified as "TV C4." "TV C4" may be identified during a method portion such as step 211 of process 200 of FIG. 2 as previously described. Channel data may be searched that includes the content identified in Play Stream 510 or Play List 560. A channel whose content sequence matches or closely matches content on such a stream or play list may be identified as the channel that delivered the consumed content. In this case, Play Stream 510 and Play List 560 include content associated with the following IDs: TV program 27, ad23, ad25, and TV program 28. Because channel data for "TV C4" indicates a sequence of: TV program 27, ad23, ad24, ad25, and TV program 28, for purposes of this example, it can reasonably be assumed that the media depicted on Stream 510, List 560, and List 590 was originally delivered to the relevant media player by channel "TV C4." In real world contexts, however, it is quite possible that more data would have to be obtained (e.g. a matching more entries on a play list entries against a longer series of content sequence data of a channel) in order to be reasonably confident that the channel has been correctly identified. The amount of data matched in the illustrated example has been chosen primarily for ease of illustration.

Sequence Data 570 for channel TV C4 indicates that ad23 as broadcast lasted three time units (see row 2), ad25 as broadcast lasted three time units (see row 4), and between ad23 and ad25, another ad, ad24, was broadcast and lasted three time units. From this information, and the information in either Play Stream 510 or Play list 560, it can be deduced that the audience member heard the very beginning of ad23, but then fast forwarded seven time units (during the span of 1 time unit based on the log time data) to just past the beginning of ad25. This deduced action is recorded in row 11 of List 590.

It should be noted that, to the extent actions take less than a single time unit, rows may be added to List 590 relative to List 560 to record such actions. For example, referring to row 4 of List 590, because no log time elapsed between the end of the event in row 3 and the beginning of the event in row 5, row 4 has been added showing the "skip forward 5 units." That the user "skipped" forward rather than "fast" forwarded can be deduced from the fact that while there is no content ID gap between rows 3 and 4 of List 560, there is a gap in the content offset times for those rows. Thus, though the log times and content ID alone suggest continuous consumption, the gap in offset times suggests a "skip" forward that took the same or less time than the length of a single time unit.

Those skilled in the art will recognize that the method aspects just described in the context of generating and using Stream 510, List 560, Data 570, and List With Deduced Actions 590 reflect just one example of how play-altering actions might be deduced using systems and methods consistent with those of the present invention. To cite but one example, rather than explicitly generate a play list, mathematical representations of play stream data and content sequence data may be used to identify discontinuities and deduce play-altering activities. To cite but one other example, play-altering might be deduced from a pre-generated play list including content offset data without needing to analyzing play stream data from which the play list was generated.

Figure 6:
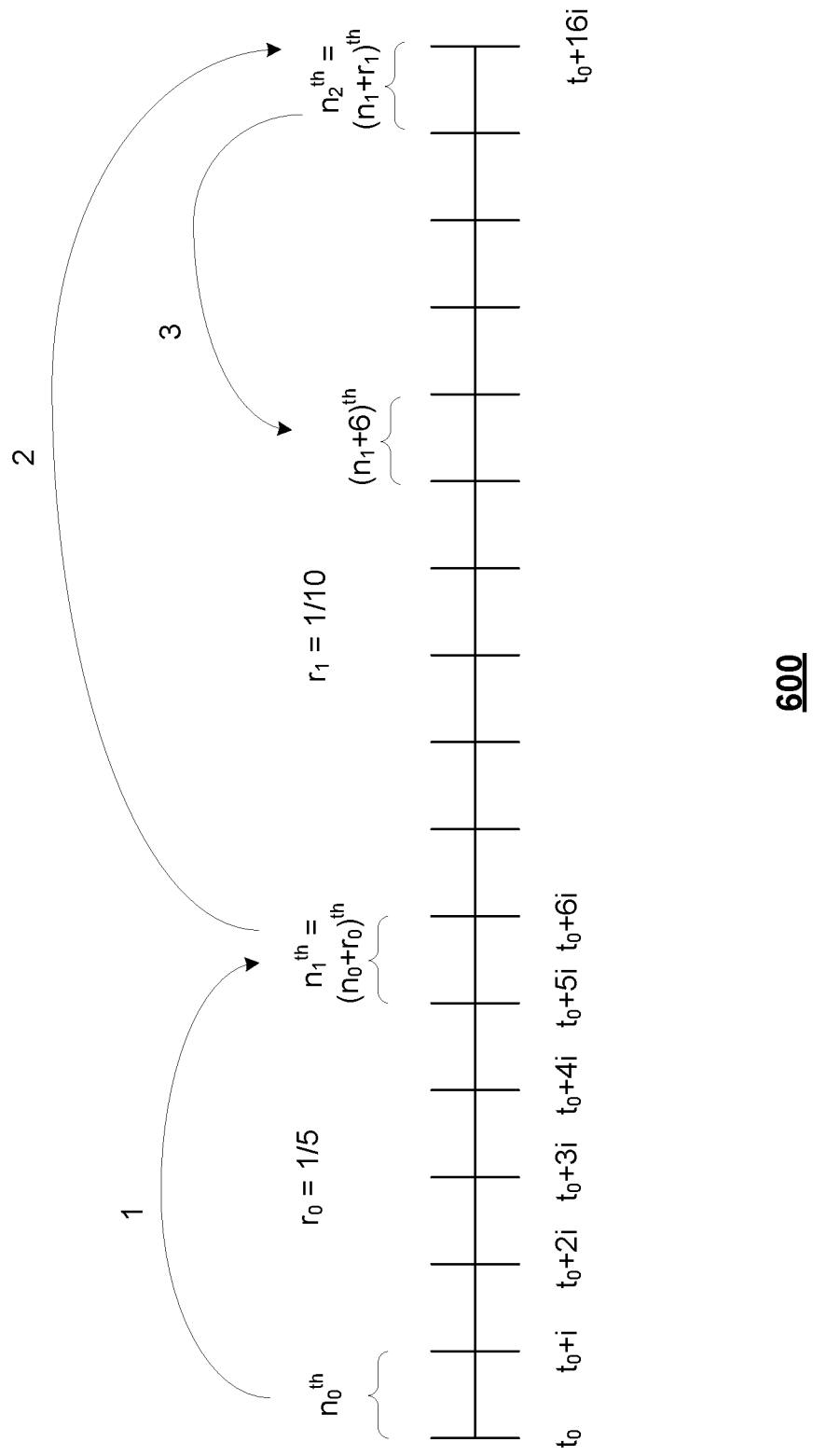
FIG. 6 illustrates timeline structure for data samples generated by system and methods such as module 121 of FIG. 1 and steps 201 and 206 of FIG. 2.

FIG. 6 illustrates timeline structure for data samples generated by system and methods such as module 121 of FIG. 1 and steps 201 and 206 of FIG. 2.

As illustrated, sample set 600 reflects a division of audio data into sixteen samples, three of which are selected for analysis. The samples selected for recognition analysis are referenced generally as the "$n_0^{th}$," $n_1^{th}$," and "$n_2^{th}$" samples. Samples between the selected samples are not separately numbered, but are marked off between vertical lines along the horizontal length of timelines structure 600 as illustrated. Each sample has a sample time window length "i." Furthermore, the sample set has varying "resolutions" including $r_0=\frac{1}{5}$ between the $n_0^{th}$ and $n_1^{th}$ samples and $rt=\frac{1}{10}$ between the $n_1^{th}$ and the $n_2^{th}$ samples. In other words, "resolution" here refers to the portion of samples being selected during a period of time. In the present example, a process portion such as steps 201 and 206 of process 200 of FIG. 2 has, based on the identification results of the $n_0^{th}$ and $n_1^{th}$ samples, adjusted the resolution from $\frac{1}{5}$ to $\frac{1}{10}$. This could occur, for example, as previously described, because the $n_0^{th}$ and $n_1^{th}$ samples match the same content ID and process 200 determines that the likelihood that the next selected sample using a resolution of $\frac{1}{5}$ would also match justifies decreasing the resolution to $\frac{1}{10}$ so that the next sample selected for analysis is the $n_2^{th}$. However, if the $n_2^{th}$ sample does not match the $n_1^{th}$ sample, then process 200 can make a backtrack decision and go back in the series of samples to select, for example, the $(n_1+6)^{th}$ sample for content recognition analysis in order to pinpoint more closely where in the play stream the content change occurred. The order in which samples are selected for analysis in this example is illustrated by arrows 1, 2, and 3 in FIG. 6.

Although not illustrated in FIG. 6, as previously described, steps 201 and 206 of method 200 can also determine based on identification results the time window length can be adjusted. In the context of FIG. 6, this would correspond to changing the value of "i," the time window length of a particular sample.

In alternative embodiments to what is illustrated and described in FIGS. 1-6, a record is created of individual media usage over time by means of an open-ended measurement system that employs portable and stationary detection devices to generate digital fingerprints of the video signal portion of the media content itself and identifies media played in the environment by means of matching such fingerprints against a database of known media. Such a video-based system may be built upon direct electrical connections and optical sensors (rather than microphones). Thus, various alternatives to the exemplary methods discussed in the context of the audio data-based embodiments illustrated in FIGS. 1-6 rely instead on video data.

Figure 7:
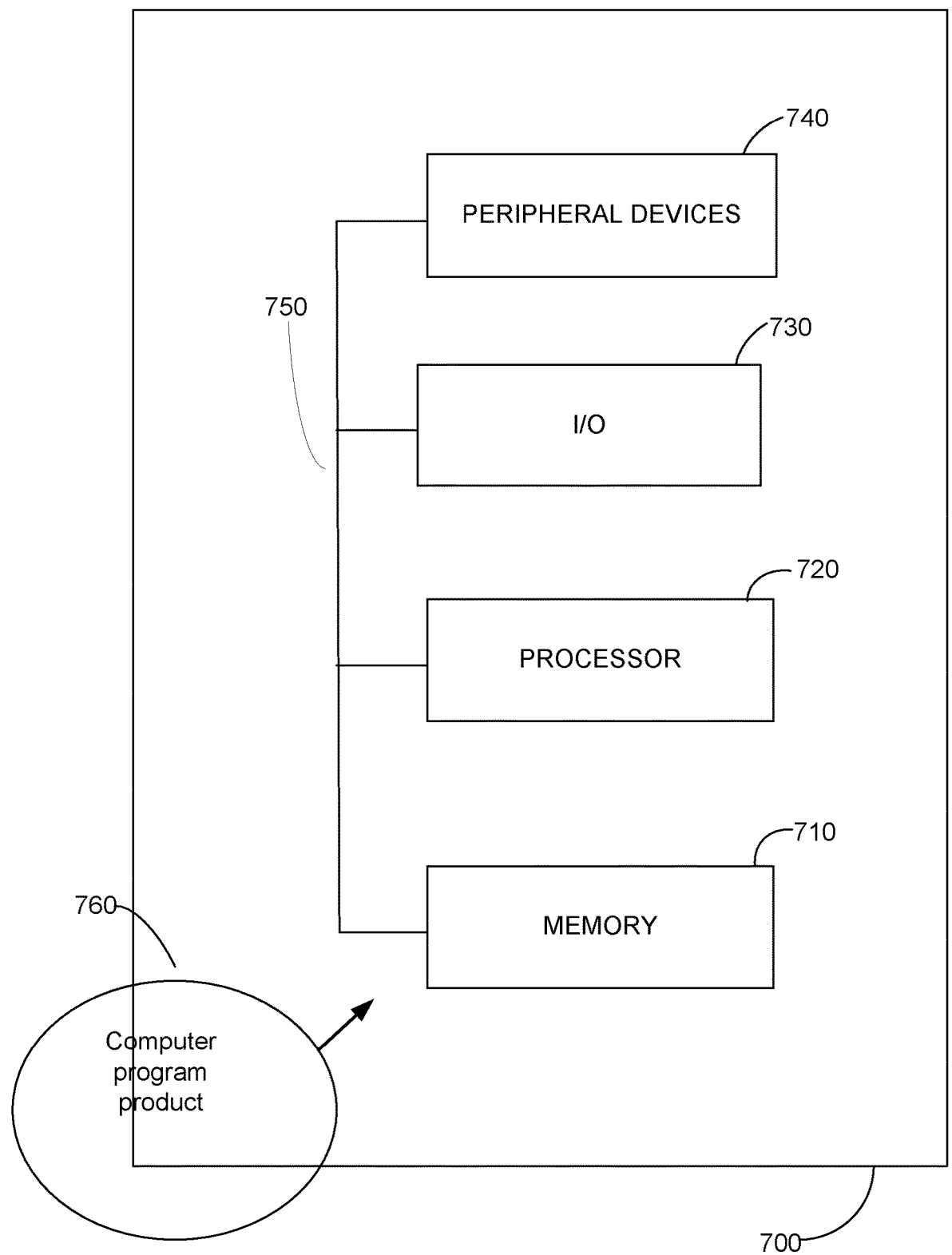
FIG. 7 shows an example of a computer system that may be used to execute instruction code contained in a computer program product, the computer program product being in accordance with an embodiment of the present invention.

FIG. 7 shows an example of a computer system 700 that may be used to execute instruction code contained in a computer program product 760 in accordance with an embodiment of the present invention. Computer program product 760 comprises executable code in an electronically readable medium that may instruct one or more computers such as computer system 700 to perform processing that implements the system 100 of FIG. 1 and/or accomplishes the exemplary method 200 of FIG. 2. The electronically readable medium may be any medium that either stores or carries electronic signals (including signals referred to as electrical signals and signals referred to as electromagnetic signals) and may be accessed locally or remotely, for example via a network connection. The executable instruction code in an electronically readable medium directs the illustrated computer system 700 to carry out various exemplary tasks described herein. The executable code for directing the carrying out of tasks described herein would be typically realized in software. However, it will be appreciated by those skilled in the art, that computers might utilize code realized in hardware to perform many or all of the identified tasks without departing from the present invention. Those skilled in the art will understand that many variations on executable code may be found that implement exemplary methods within the spirit and the scope of the present invention.

The code or a copy of the code contained in computer program product 760 may be stored in memory 710 for execution by processor 720. Computer system 700 also includes I/O subsystem 730 and peripheral devices 740. I/O subsystem 730, peripheral devices 740, processor 720, and memory 710 are coupled via bus 750.

Those skilled in the art will appreciate computer system 700 illustrates just one example of a system in which a computer program product in accordance with an embodiment of the present invention may be implemented. To cite but one example of an alternative embodiment, execution of instructions contained in a computer program product in accordance with an embodiment of the present invention may be distributed over multiple computers, such as, for example, over the computers of a distributed computing network.

Although particular embodiments have been described in detail and certain variants have been noted, various other modifications to the embodiments described herein may be made without departing from the spirit and scope of the present invention. Thus, the invention is limited only by the appended claims.

What is claimed is:

1. A media measurement method comprising:
   (a) receiving over a network, at one or more computers, data for a sequence of video data samples, the video data samples comprising representations of video data captured at a media monitoring device, the plurality of video data samples being submitted over the network;
   (b) using the one or more computers to query an electronic database of a plurality of video data representations and corresponding content identifiers;
   (c) generating a raw play stream, the raw play stream comprising a sequence of content identification results corresponding to the sequence of video data samples; wherein:
      the sequence of content identification results is obtained by querying the electronic database to attempt to determine respective likely matches between respective video data samples in the sequence of video data samples and respective video data representations in the electronic database;
      a content identification result of the sequence of content identification results comprises either: (i) a content identifier associated in the electronic database with a respective video data representation that is determined to be a respective likely match with a respective one of the video data samples; or (ii) an indication of the absence of a respective likely match between a respective video data sample and a video data representation in the electronic database; and
      the raw play stream includes either: at least two different content identifiers obtained from the electronic database; or at least one content identifier obtained from the electronic database and at least one indication of the absence of a respective likely match between a respective video data sample and a video data representation in the electronic database;
   (d) scrubbing the raw play stream by analyzing sample sequence data of the raw play stream to determine whether to change a result of the sequence of content identification results in view of a pattern of the sample sequence data of the raw play stream compared to an expected pattern of sample sequence data;
   (e) generating a clean play stream from the raw play stream by making any changes to the raw play stream that are determined to be made by the scrubbing; and
   (f) generating a clean play list from the clean play stream, wherein the clean play list comprises a list of continuous media consumption events, wherein at least one continuous media consumption event on the clean play list corresponds to multiple consecutive samples on the clean play stream that have a same content identification result.

2. The media measurement method of claim 1 wherein the clean play list comprises, for a continuous media consumption event included on the list of continuous media consumption events, an indication of the duration of the continuous media consumption event.

3. The media measurement method of claim 1 wherein sample sequence data includes at least one of log times, content identifiers, and content offsets.

4. The media measurement method of claim 1 wherein:
   scrubbing the raw play stream further comprises analyzing channel data as part of determining whether to change a result of the sequence of content of identification results.

5. The media measurement method of claim 1 wherein:
   scrubbing the raw play stream further comprises using audience data as part of determining whether to change a result of the sequence of content of identification results.

6. The media measurement method of claim 1 wherein the plurality of video data representations include a plurality of video signatures.

7. The media measurement method of claim 1 wherein a video data representation of the plurality of video data representations includes a plurality of signal landmarks.

8. The media measurement method of claim 1 wherein a video data representation of the plurality of video data representations includes a signal usable for generating video energy corresponding to video energy captured at the media monitoring device.

9. The media measurement method of claim 1 wherein the clean play list comprises, for a continuous media consumption event included in the list of continuous media consumption events, an indication of the channel of the continuous media consumption event.

10. A media measurement method comprising:
   (a) receiving over a network, at one or more computers, data for a sequence of audio data samples, the audio data samples comprising representations of audio data captured at a media monitoring device, the plurality of audio data samples being submitted over the network;
   (b) using the one or more computers to query an electronic database of a plurality of audio data representations and corresponding content identifiers;
   (c) generating a raw play stream, the raw play stream comprising a sequence of content identification results corresponding to the sequence of audio data samples; wherein:
      the sequence of content identification results is obtained by querying the electronic database to attempt to determine respective likely matches between respective audio data samples in the sequence of audio data samples and respective audio data representations in the electronic database;
      a content identification result of the sequence of content identification results comprises either: (i) a content identifier associated in the electronic database with a respective audio data representation that is determined to be a respective likely match with a respective one of the audio data samples; or (ii) an indication of the absence of a respective likely match between a respective audio data sample and an audio data representation in the electronic database; and
      the raw play stream includes either: at least two different content identifiers obtained from the electronic database; or at least one content identifier obtained from the electronic database and at least one indication of the absence of a respective likely match between a respective audio data sample and an audio data representation in the electronic database;
(d) scrubbing the raw play stream by analyzing sample sequence data of the raw play stream to determine whether to change a result of the sequence of content identification results in view of a pattern of the sample sequence data of the raw play stream compared to an expected pattern of sample sequence data;
(e) generating a clean play stream from the raw play stream by making any changes to the raw play stream that are determined to be made by the scrubbing; and
(f) generating a clean play list from the clean play stream, wherein the clean play list comprises a list of continuous media consumption events, wherein at least one continuous media consumption event on the clean play list corresponds to multiple consecutive samples on the clean play stream that have a same content identification result.

11. The media measurement method of claim 10 wherein the clean play list comprises, for a continuous media consumption event included on the list of continuous media consumption events, an indication of the duration of the continuous media consumption event.

12. The media measurement method of claim 10 wherein sample sequence data includes at least one of log times, content identifiers, and content offsets.

13. The media measurement method of claim 10 wherein: scrubbing the raw play stream further comprises analyzing channel data as part of determining whether to change a result of the sequence of content of identification results.

14. The media measurement method of claim 10 wherein: scrubbing the raw play stream further comprises using audience data as part of determining whether to change a result of the sequence of content of identification results.

15. The media measurement method of claim 10 wherein the plurality of audio data representations include a plurality of audio signatures.

16. The media measurement method of claim 10 wherein an audio data representation of the plurality of audio data representations includes a plurality of signal landmarks.

17. The media measurement method of claim 10 wherein an audio data representation of the plurality of audio data representations includes a signal usable for generating audio energy corresponding to audio energy captured at the media monitoring device.

18. The media measurement method of claim 10 wherein the clean play list comprises, for a continuous media consumption event included in the list of continuous media consumption events, an indication of the channel of the continuous media consumption event.

* * * * *